US008296739B2

(12) United States Patent
Kalla et al.

(10) Patent No.: US 8,296,739 B2
(45) Date of Patent: Oct. 23, 2012

(54) TESTING SOFT ERROR RATE OF AN APPLICATION PROGRAM

(75) Inventors: Ronald Nick Kalla, Round Rock, TX (US); Jeffrey William Kellington, Pflugerville, TX (US); Naoko Pia Sanda, Rensselaer, NY (US); Todd Alan Venton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1224 days.

(21) Appl. No.: 12/059,897

(22) Filed: Mar. 31, 2008

(65) Prior Publication Data

US 2009/0249301 A1  Oct. 1, 2009

(51) Int. Cl.
    G06F 9/44 (2006.01)
(52) U.S. Cl. .................. 717/127; 717/124; 717/126
(58) Field of Classification Search .................. None
    See application file for complete search history.

(56) References Cited

U.S. PATENT DOCUMENTS

| | | | |
|---|---|---|---|
| 4,308,616 A | | 12/1981 | Timoc |
| 4,759,019 A | | 7/1988 | Bentley |
| 4,996,688 A | | 2/1991 | Byers |
| 5,404,496 A | | 4/1995 | Burroughs et al. |
| 5,475,624 A | | 12/1995 | West |
| 5,513,339 A | | 4/1996 | Agrawal et al. |
| 5,550,844 A | | 8/1996 | Lucas |
| 5,561,762 A | * | 10/1996 | Smith et al. .................. 714/33 |
| 5,598,564 A | * | 1/1997 | Barker, III .................. 717/126 |
| 5,671,352 A | | 9/1997 | Subrahmaniam et al. |
| 5,896,401 A | | 4/1999 | Abramovici et al. |
| 6,167,479 A | * | 12/2000 | Hartnett et al. .................. 710/260 |
| 6,327,700 B1 | * | 12/2001 | Chen et al. .................. 717/127 |
| 6,370,492 B1 | | 4/2002 | Akin |
| 6,457,147 B1 | * | 9/2002 | Williams .................. 714/703 |
| 6,484,276 B1 | | 11/2002 | Singh |
| 6,513,133 B1 | * | 1/2003 | Campbell .................. 714/38.14 |
| 6,536,008 B1 | | 3/2003 | Nadeau-Dostie |
| 6,671,860 B2 | | 12/2003 | Langford |
| 6,704,894 B1 | | 3/2004 | Kania |
| 6,728,668 B1 | | 4/2004 | Kitamorn |
| 6,751,756 B1 | | 6/2004 | Hartnett |
| 6,789,054 B1 | | 9/2004 | Makhlouf |

(Continued)

OTHER PUBLICATIONS

Christmansson et al., "An Experimental Comparison of Fault and Error Injection", IEEE, Nov. 1998, <http://ieeexplore.ieee.org/stamp/stamp.jsp?tp=&arnumber=730903> pp. 1-10.*

(Continued)

*Primary Examiner* — Thuy Dao
*Assistant Examiner* — Samuel Hayim
(74) *Attorney, Agent, or Firm* — Yee & Associates, P.C.

(57) ABSTRACT

Techniques are provided for determining consequences of an injected fault on a system running a given application program or operating system, in order to measure the software impact of a hardware soft error on the application program/operating system. The application program software is emulated instruction-by-instruction, where source operands are randomly modified before an instruction is executed, and destination operands are randomly modified after an instruction is executed, in order to mimic hardware soft errors. In addition, a program counter is randomly modified after execution of a branch instruction. The resulting consequences of such modifications are monitored such that a fault of an instruction being executed is modeled in order to determine a soft error rate (SER) for a software application program or operating system.

16 Claims, 3 Drawing Sheets

U.S. PATENT DOCUMENTS

| | | | |
|---|---|---|---|
| 6,880,112 B2* | 4/2005 | Lajolo | 714/42 |
| 6,886,116 B1* | 4/2005 | MacLellan et al. | 714/703 |
| 7,020,803 B2 | 3/2006 | Wolin | |
| 7,024,661 B2* | 4/2006 | Leino et al. | 717/126 |
| 7,047,176 B2* | 5/2006 | Klevans et al. | 703/21 |
| 7,120,559 B1* | 10/2006 | Williams et al. | 702/185 |
| 7,185,232 B1 | 2/2007 | Leavy | |
| 7,191,111 B2 | 3/2007 | Schuppe | |
| 7,284,159 B2 | 10/2007 | Chakraborty | |
| 7,320,114 B1* | 1/2008 | Jain et al. | 716/106 |
| 7,536,605 B2* | 5/2009 | Keaffaber et al. | 714/41 |
| 7,546,585 B2* | 6/2009 | Ault | 717/124 |
| 7,587,639 B2* | 9/2009 | Marisetty et al. | 714/41 |
| 7,797,574 B2* | 9/2010 | Liardet et al. | 714/11 |
| 8,073,668 B2 | 12/2011 | Kellington et al. | |
| 2001/0049594 A1* | 12/2001 | Klevans | 703/14 |
| 2003/0172321 A1* | 9/2003 | Wolin et al. | 714/41 |
| 2004/0060017 A1 | 3/2004 | Abdennadher | |
| 2004/0158818 A1* | 8/2004 | Smith et al. | 717/127 |
| 2004/0194063 A1* | 9/2004 | Pereira | 717/124 |
| 2004/0205720 A1* | 10/2004 | Hundt | 717/124 |
| 2004/0237062 A1* | 11/2004 | Zeidman et al. | 717/100 |
| 2004/0243882 A1 | 12/2004 | Zhou | |
| 2004/0268313 A1* | 12/2004 | Teglia et al. | 717/124 |
| 2005/0015679 A1* | 1/2005 | Edgar et al. | 714/43 |
| 2005/0050393 A1 | 3/2005 | Chakraborty | |
| 2005/0071818 A1* | 3/2005 | Reissman et al. | 717/127 |
| 2005/0251703 A1* | 11/2005 | Liardet et al. | 714/17 |
| 2005/0262457 A1 | 11/2005 | Granier | |
| 2006/0112307 A1* | 5/2006 | Marisetty et al. | 714/11 |
| 2006/0126800 A1* | 6/2006 | Burk | 379/26.01 |
| 2006/0265578 A1* | 11/2006 | Modave et al. | 712/245 |
| 2006/0271825 A1* | 11/2006 | Keaffaber et al. | 714/38 |
| 2006/0277540 A1* | 12/2006 | Bhattacharya | 717/174 |
| 2007/0011599 A1* | 1/2007 | Levitan | 714/801 |
| 2007/0088520 A1 | 4/2007 | Hagerott | |
| 2007/0106490 A1 | 5/2007 | Zhu | |
| 2007/0209032 A1* | 9/2007 | Mihai et al. | 717/126 |
| 2007/0294574 A1 | 12/2007 | Tai | |
| 2008/0016477 A1 | 1/2008 | Kleinosowski et al. | |
| 2009/0193296 A1* | 7/2009 | Kellington et al. | 714/33 |

OTHER PUBLICATIONS

Bagchi et al., "Design and Evaluation of Preemptive Control Signature (PECOS) Checking for Distributed Applications", University of Illinois, 2002, <http://users.crhc.illinois.edu/kalbar/papers/TC_PECOS.pdf> pp. 1-36.*

Volkmar Sieh, "Fault-Injector using UNIX ptrace Interface", Friedrich-Alexander University, Nov. 1993, <http://www3.informatik.uni-erlangen.de/Publications/Reports/ir_11_93.pdf> pp. 1-14.*

Kab Joo Lee, "Fault Sensitivity Analysis of a 32-Bit RISC Microprocessor", IEEE, 1999, <http://ieeexplore.ieee.org/stamp/stamp.jsp?tp=&arnumber=820992> pp. 1-4.*

Nicholas J. Wang et al., "Examining ACE Analysis Reliability Estimates Using Fault-Injection", ACM, 2007, <http://delivery.acm.org/10.1145/1260000/1250719/p460-wang.pdf> pp. 1-10.*

U.S. Appl. No. 12/022,869, filed Jan. 30, 2008, Sanda et al.

USPTO Non-final office action dated Dec. 23, 2010 regarding U.S. Appl. No. 12/022,869.

USPTO Notice of allowance dated Aug. 1, 2011 regarding U.S. Appl. No. 12/022,869.

Bell et al., "Automatic Testcase Synthesis and Performance Model Validation for High-Performance PowerPC Processors," 2006 IEEE International Symposium on Performance Analysis of Systems and Software, Mar. 2006, pp. 12 pages.

Faure et al., "Single-Event-Upset-Like Fault Injection: a comprehensive framework," IEEE Transactions on Nuclear Science, vol. 52, No. 6, Dec. 2006, pp. 2205-2209.

Kayser et al., "Hyper-acceleration and HW/SW co-verification as an essential part of IBM eServer z900 verification," IEEE HPCA, Nov. 2005, pp. 597-605.

Kim et al., "Soft Error Sensitivity Characterization for Microprocessor Dependability Enhancement Strategy," IEEE DSN, Jun. 2003, 10 pages.

Kudva et al., "Fault Injection Verification of IBM POWER6 Soft Error Resilience," Workshop on Architectural Support for Gigascale Integration, ISCA-07, San Diego, CA, Jun. 2007, 5 pages.

Nguyen et al., "Chip-Level Soft Error Estimation Method," IEEE Transactions on Device and Materials Reliability, vol. 5, No. 3, Sep. 2005, pp. 365-381.

Sieh et al., "VHDL-Based Fault Injection with VERIFY," Institute for Mathematical Machines, University of Erlangen-Nurenberg, May 1996, pp. 1-19.

Slater, "Fault Injection," Carnegie Mellon University, Dependable Embedded Systems, Spring 1998, pp. 1-6, accessed Sep. 15, 2011: http://www.ece.cmu.edu/~koopman/des_s99/fault_injection/index.html.

Wang et al., "Characterizing the Effects of Transient Faults on a High-Performance Processor Pipeline," Processing International Conference on Dependable Systems and Networks, Jul. 2004, 10 pages.

Wazlowski et al., "Verification Strategy for the Blue Gene/L Chip," IBM JRD, vol. 49, No. 2/3, Mar.-May 2005, pp. 303-318.

Kahle, "Architecture Validation Programs Generation for Any User Programs", Technical Disclosure Bulletin, vol. 36, No. 10, 1993, p. 489-490.

Cabezas, "Personal Systems Functional Architectural Verification Methodology", Technical Disclosure Bulletin, No. 10b vol. 03, 1992, p. 141-145.

* cited by examiner

TESTING SOFT ERROR RATE OF AN APPLICATION PROGRAM

BACKGROUND OF THE INVENTION

1. Field of the Invention

The disclosures herein relate generally to test systems, and more particularly, to a methodology and apparatus for testing software program susceptibility to soft hardware errors.

2. Description of the Related Art

An information handling system (IHS) may include a processor integrated circuit (IC) for processing, handling, communicating or otherwise manipulating information. Modem IHSs often include integrated circuits (ICs) that incorporate several components integrated together on a common semiconductor die. Some IHSs operate as test systems or test managers that evaluate the functionality and performance characteristics of IC designs during the development process of the IC design. A device under test (DUT) is another name for an IC design on which a test system conducts tests.

During operation, ICs may experience hard errors or soft errors. Hard errors are IC faults that persist over time. For example, an IC may experience a short circuit or an open circuit that does not go away with time. In contrast, a soft error is an error that may occur once and then not recur over time. For example, a cosmic ray or alpha particle may pass through a latch in the IC and cause the latch to change state or "flip". Noise in a circuit adjacent the IC may also cause a soft error.

Unfortunately, soft error rate (SER) is increasing in today's ICs due to higher device density in these ICs. Lower IC operating voltage also makes an IC more susceptible to soft errors, thus causing higher SER than in the past. Arrays within ICs, such as memory and caches, are susceptible to soft errors. Combinatorial logic within ICs is also susceptible to soft errors. A conventional way to deal with increasing SER in memory arrays is to employ error correction code (ECC) memory and scrubbing. However, increasing SER in the logic and data flow paths of ICs is a more complex problem. One approach is to employ redundancy in the logic to decrease or correct for SER. However, redundancy is a difficult and costly solution.

It is frequently hard to determine the SER of an IC or system of ICs. One way to perform an SER determination is to actually fabricate the IC or IC system. After fabrication of the IC system, specialized test apparatus may bombard the IC system with cosmic rays and alpha particles in a laboratory environment to create faults or errors. Test apparatus measures the SER of the IC system while bombardment continues. Unfortunately, this approach requires completion of the IC design and fabrication of the actual hardware of the IC system prior to testing. This approach undesirably limits the amount of controllability and observability of the IC design during experimentation.

Another way to determine SER effects is by fault injection into a software simulation or software model of a particular IC hardware design. Unfortunately, this software simulation model approach may be very slow. The size of the software model is also typically limited such that the software model may include just a portion of the IC design rather than the entire IC design when the IC is very large.

Soft error rates in logic have become a threat to the reliable and continuous operation of systems. A characteristic of SER which is both beneficial and challenging is the "derating". Not every flipped bit is hazardous. Many simply vanish without consequence, and others are caught by hardware and software checkers. The number of upsets that become machine checkstops or silent data corruption events can be very small. The derating is the ratio of bit flips to dangerous events. If every bit flip in a latch or combinational logic circuit needed to be counted in the system failure rate, there would be a huge problem that would make systems unusable. Fortunately, derating can be made large enough in well-constructed designs that SER targets can be met.

The challenge with derating is that there does not currently exist an accurate means for prediction (i.e. pre-production prediction of SER). Currently, the best that can be done is to validate SER after the hardware becomes available. This is achieved by accelerated testing using particle beams for cosmic effects and for measuring derating, and hot underfill (HUF) for measuring alpha particle effects. However, these methods do not work before the hardware is available. An additional limitation is that it is difficult to assess whether an event was derated by the hardware, or alternatively by a software application.

It would thus be desirable to understand derating factors for both hardware and software when assessing the SER risk of a micro-architecture hardware design. Commonly assigned and co-pending patent application serial number 12/022,869 filed on Jan. 30, 2008, and which issued as U.S. Pat. 8,073,668 on Dec. 6, 2011, provides a system and method for determining the derating factors associated with hardware. The following description describes a system and method for determining the derating factors associated with software.

BRIEF SUMMARY OF THE INVENTION

According to one embodiment of the present invention, techniques are provided for determining consequences of an injected fault on a system running a given application program or operating system, in order to measure the software impact of a hardware soft error on an application program/operating system. The application program/operating system software is emulated instruction-by-instruction, where source operands are randomly modified before an instruction is executed, and destination operands are randomly modified after an instruction is executed, in order to mimic hardware soft errors. In addition, a program counter is randomly modified after execution of a branch instruction. A random instruction can also be executed in lieu of an intended instruction. The resulting consequences of such modifications are monitored such that a fault of an instruction being executed is modeled in order to determine a soft error rate (SER) for a software application program or operating system.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The present invention is directed to a method and apparatus for determining consequences of an injected fault on a system running a given application program or operating system, in order to measure the software impact of a hardware soft error on an application program/operating system. The application program/operating system software is emulated instruction-by-instruction, where source operands are randomly modified before an instruction is executed, and destination operands are randomly modified after an instruction is executed, in order to mimic hardware soft errors. In addition, a program counter is randomly modified after execution of a branch instruction. A random instruction can also be executed in lieu of an intended instruction. These modifications are done in the preferred embodiment by flipping one or more bits in the operands, program counter or instruction opcode, respectively, in order to mimic a hardware soft error. The resulting consequences of such modifications are monitored such that a fault of an instruction being executed is modeled in order to determine a soft error rate (SER) for a software application program/operating system.

Figure 1:
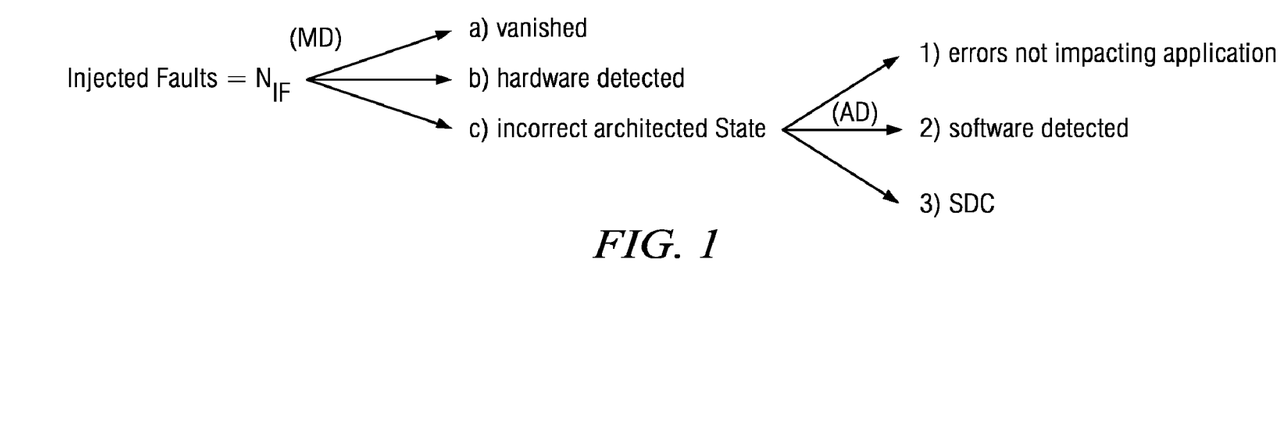
FIG. 1 shows the possible impacts an injected fault due to a soft error can have on a system running a given application.

FIG. 1 shows the possible impacts an injected fault due to a soft error can have on a system running a given application. Vector 3) represents Silent Data Corruption (SDC), which is the leading concern among microprocessor designers when considering soft error mitigation techniques. All other outcomes are considered derated outcomes, when considering Silent Data Corruption, as even though an incorrect architected state results from the injected fault, there is no adverse irreversible damage associated with such outcomes as either (i) the resulting error has no consequence or (ii) the resulting error is detected.

On the left side of FIG. 1, vectors a), b), and c), represent the outcomes concerned with Machine Derating (MD). Machine Derating describes the tendency for soft errors to be detected by hardware, as indicated by vector b), or to go undetected by hardware but not impact the architected state of the machine, as indicated by vector a). Vector c) represents all soft errors that are not detected by the machine hardware and that result in the architected state of the system being changed incorrectly.

On the right side of FIG. 1, vectors 1), 2), and 3), represent the outcomes associated with Application Derating (AD). An application can only be affected by a soft error if the architected state of the system is modified; therefore, vectors 1), 2), and 3) are all drawn off of vector c). Application Derating describes the tendency of an application program or operating system to detect incorrect changes in the architected state of the system, as indicated by vector 2), or for the error to go undetected but not impact the intended result, as indicated by vector 1), with both scenarios leading to a desirable increase in the SER derating as these errors have no lasting consequence to the system's overall health/execution.

The goal of the process described herein is to understand the derating effects of both the machine under test (MD effects) and the application (program or operating system) it is running (AD effects). Machine Derating is dependent on the micro-architecture of the machine under test, the relative performance (IPC and frequency), and the instruction mix of the application that is running on the machine. It is important to point out that Machine Derating is not dependent on a specific application. Applications can be grouped into application classes based on instruction mix so that a measured Machine Derating can be applied to all applications in an application class.

Application Derating is solely dependent on the machine code for a compiled application. This allows for Application Derating to be measured by readily available software simulation as opposed to costly accelerated fault injection.

The process described by the present invention consists of performing two experiments for each class of applications to be considered. These experiments establish probabilities for vectors 1), 2), 3), and b). Mathematics can then be used to determine the probabilities of vectors a) and c).

The first experiment defines the Application Derating factor for a given application. The application is compiled and run on an architectural level software simulator or emulator. Randomly, during an appropriate interval of execution during the software simulation/emulation, an architectural error is injected that causes an instruction to be incorrectly executed. The impact of the injected error is recorded according to vectors 1), 2), and 3) of FIG. 1.

A second experiment is performed to determine the Machine Derating factor for a class of applications running on a specific machine. This experiment consists of running an application on a machine while performing accelerated fault injection. Examples of accelerated fault injection include proton irradiation, neutron irradiation, Hot Under-Fill, Statistical Fault Injection, etc.

Returning to FIG. 1, the measurable outcomes of an injected fault on an actual machine or simulation model of a machine are vectors b), 2), and 3). Vectors a), c), and 1) need to be extrapolated from the experiment by using the Application Derating factor obtained from the first experiment. Knowing the number of times that vectors 2) or 3) occurred in experiment 2 allows for one to estimate the number of times that a injected fault led to incorrect architected state, using the probabilities obtained in experiment 1.

The following equations describe the relationships of all the vectors in FIG. 1. $P_1$, $P_2$, $P_3$, $P_a$, $P_b$, $P_c$ represent the probability that the given vector will occur. $N_1$, $N_2$, $N_3$, $N_a$, $N_b$, $N_c$ represent the number of times an injected fault resulted in the associated vector. $N_{IF}$ represents the total number of faults injected during experiment 2.

$$P_1+P_2+P_3=100\%$$

$$P_a+P_b+P_c=100\%$$

$$N_{IF}=N_a+N_b+N_c$$

$$N_c=N_1+N_2+N_3$$

Let $P_1$, $P_2$, $P_3$ represent probabilities of outcomes 1), 2) and 3) given an incorrect architected state occured, established by experiment 1. Given $N_{IF}$ injected faults, let $N_2$, $N_3$, $N_b$ represent the number of times outcomes 2), 3) and b) occurred in experiment 2. One can calculate $N_a$, $N_c$, and $N_1$ using the following formulas.

$$P_3=N_3/N_c, \text{ therefore } N_c=N_3/P_3$$

$$N_1=N_c*P_1$$

$$N_a=N_{IF}-(N_b+N_c)$$

Given $N_a$, $N_b$, $N_c$, the probabilities of those outcomes are easily calculated by the following equations.

$$P_a=N_a/N_{IF}$$

$$P_b=N_b/N_{IF}$$

$$P_c=N_c/N_{IF}$$

Now that the graph is fully understood, the probability for an injected fault to result in an outcome such as 3) SDC, can be calculated by the following equation:

$$P_{IF \to sdc}=P_c*P_3.$$

The method is not limited to only understanding the derating of soft errors as concerned with silent data corruption. One can use the previous formulas to determine the probabilities for an injected fault or soft error to result in an application/operating system or hardware detected error.

It is important to note that the results obtained for the Machine Derating component, $P_a$, $P_b$, and $P_c$, are transferable to all of software applications in their associated class. That means that only one costly injected fault experiment, referred to as experiment 2, needs to be performed per application class. $P_1$, $P_2$, and $P_3$ can be determined for all applications in a class using readily available architectural level software simulators.

A representative flow diagram depicting an example of statistical fault injection will now be described with reference to FIG. 2. A fault injection experiment starts at the start of the test program's execution as depicted in block 210. A random number, X, is picked between 1 and N, where N is a predetermined number of instructions based on the time it takes to run the application to completion. The simulation is progressed by X instructions, as shown in block 220. The instruction that is next to execute is evaluated to determine its type at block 230. If it is a Branch instruction, the Branch instruction is executed at block 240, and then the resultant Program Counter (PC) is modified at block 250 to mimic the Branch instruction executing incorrectly (fault injection). The PC can be modified in several ways, including: flip one bit in the PC, flip multiple bits in the PC, if the branch was "taken" then set the PC to the "not-taken" path, and if the branch was "not taken" then set the PC to the "taken" path.

If the instruction is not a Branch instruction, as determined at block 230, the experiment flow can go down one of two paths, depending on whether a source (blocks 260, 270, 280) or destination (blocks 290, 300) operand of the instruction is to be modified. If a source operand is to be modified (to inject a fault), the operand is logged and then modified at block 260, and then the modified instruction is executed at block 270. The operand that was modified is then restored to the previously logged value at block 280. This distinguishes errors that might occur in the lookup or access of a source operand, rather than simulate previous errors that impacted the architected state. Alternatively, if a destination operand of the next-to-execute instruction is to be modified, this next-toexecute instruction is executed at block 290, and then the destination operand is modified at block 300. Some representative operand types include General Purpose Regfiles, Floating Point Regfiles, Data Memory, Special Purpose Registers, Immediate Values, etc. Any architected facility that the instruction reads or writes is subject to random modification.

Figure 2:
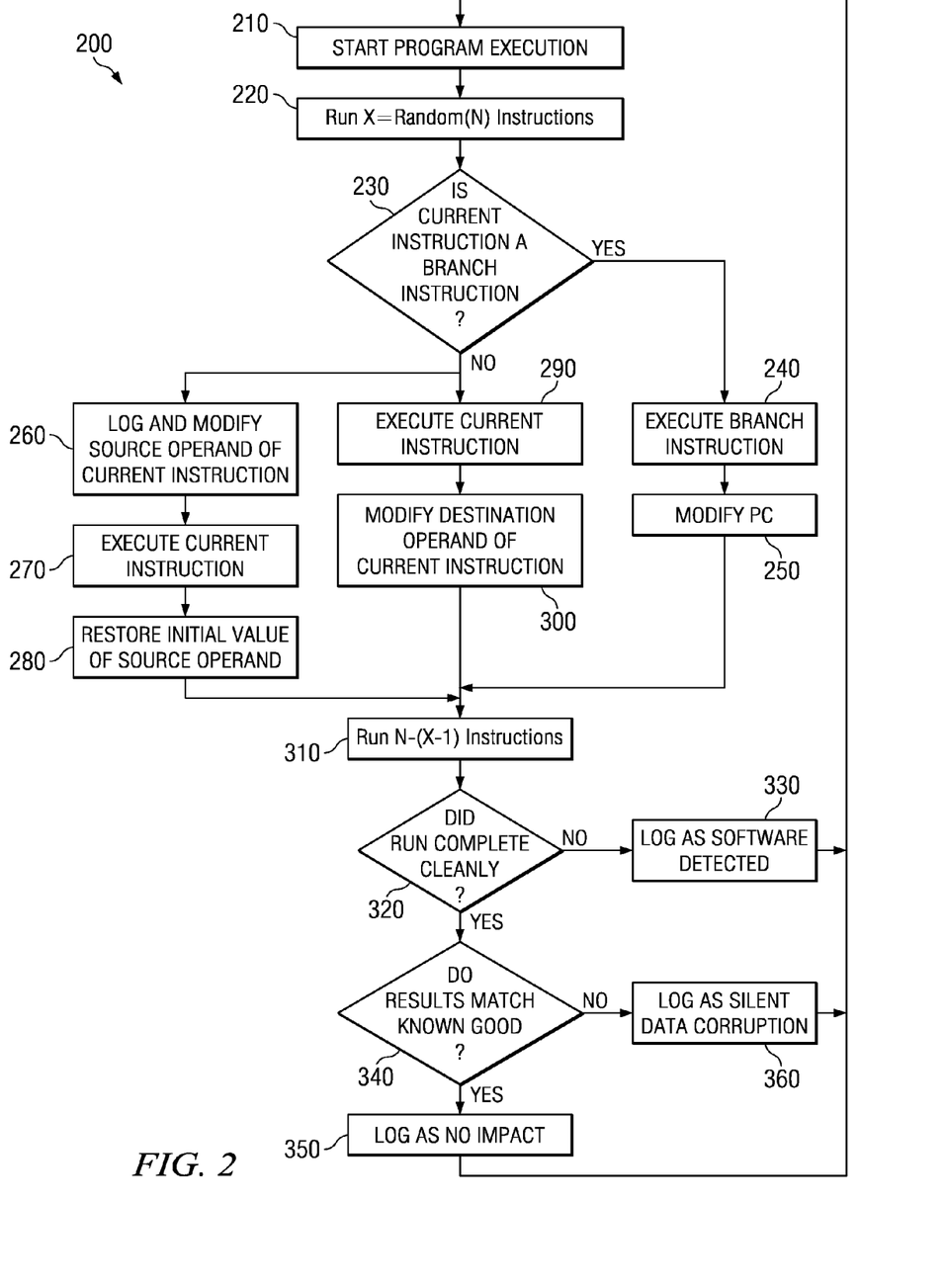
FIG. 2 is a flow diagram depicting an example of statistical fault injection.

In addition, while not shown in the flowchart of FIG. 2, it is also possible to randomly modify an instruction, such as by flipping any bit in the instruction, including the opcode field, immediate values, reserved fields, etc.

Next, the application is run to where normal completion would occur by executing N−(X−1) instructions at block 310. It is then determined, at block 320, whether the run completed cleanly via console output or return/log files. If there was an error reported by the operating system or the application program itself, the experiment is logged as "Software Detected" at block 330 (which corresponds to vector 2) of FIG. 1). If instead the run completed cleanly, the resultant data is compared to a known good set of data at block 340. If there were no differences in the resultant data (which resulted from the error injection), the experiment is logged as "No Impact" at block 350 (which corresponds to vector 1) of FIG. 1). Otherwise, the experiment is logged as "Silent Data Corruption" at block 360 (which corresponds to vector 3) of FIG. 1).

The experiment is repeated until a statistically meaningful number of experiments have been run. Typically, the experiment is repeated hundreds or thousands of times, although statistically these experiments normalize fairly quickly. The probability of each of the outcomes in FIG. 1 can be calculated by dividing the occurrence of each outcome by the total number of experiments that are run. The combination of factors that derate a given event from happening can be summarized by a "derating factor" for that event. The derating factor is the inverse of the probability of that event occurring. Given FIG. 1, if the probability of vector 3) is 1/N, then, on average, N events need to occur to observe one (1) occurrence of Silent Data Corruption (SDC). In that example, N−1 events are considered to be "derated events" as it pertains to SDC.

Thus, the above described process is able to determine a SER derating factor associated with the software (as opposed to the hardware) by randomly injecting faults into actual instructions and their associated execution flow and observing and tabulating the type of error that results from such random fault injection.

Figure 4:
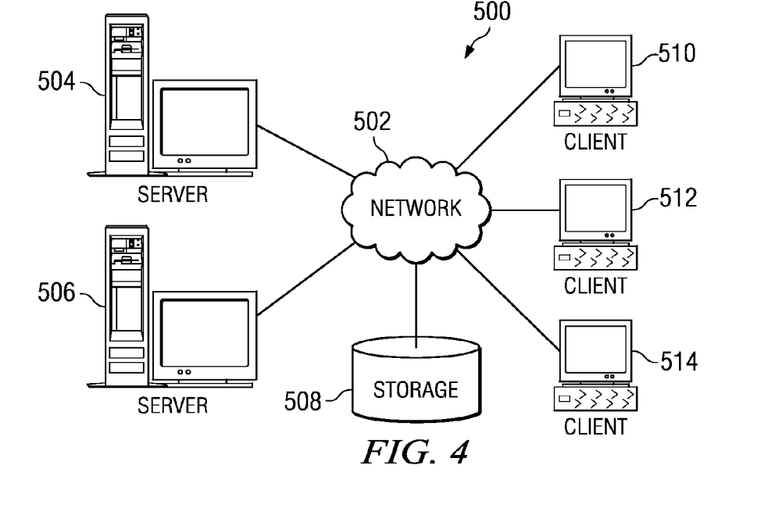
FIG. 4 depicts a pictorial representation of a network of data processing systems in which embodiments of the present invention may be implemented.
Figure 5:
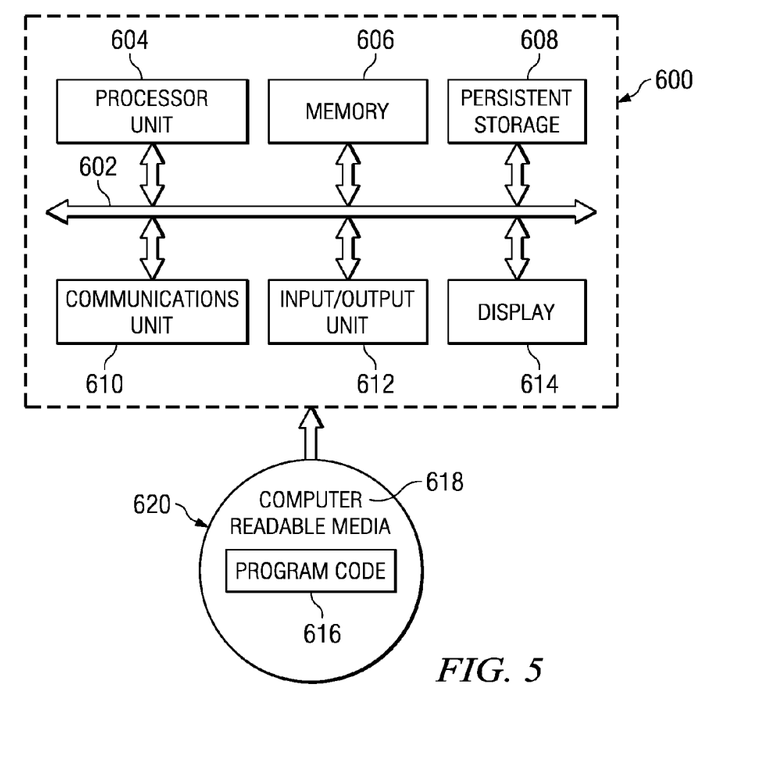
FIG. 5 is a block diagram of a data processing system in which embodiments of the present invention may be implemented.

With reference now to FIGS. 4-5, exemplary diagrams of data processing environments are provided in which illustrative embodiments may be implemented. It should be appreciated that FIGS. 4-5 are only exemplary and are not intended to assert or imply any limitation with regard to the environments in which different embodiments may be implemented. Many modifications to the depicted environments may be made.

FIG. 4 depicts a pictorial representation of a network of data processing systems in which illustrative embodiments may be implemented. Network data processing system 500 is a network of computers in which the illustrative embodiments may be implemented. Network data processing system 500 contains network 502, which is the medium used to provide communications links between various devices and computers connected together within network data processing system 500. Network 502 may include connections, such as wire, wireless communication links, or fiber optic cables.

In the depicted example, server 504 and server 506 connect to network 502 along with storage unit 508. In addition, clients 510, 512, and 514 connect to network 502. Clients 510, 512, and 514 may be, for example, personal computers or network computers. In the depicted example, server 504 provides data, such as boot files, operating system images, and applications to clients 510, 512, and 514. Clients 510, 512, and 514 are clients to server 504 in this example. Network data processing system 500 may include additional servers, clients, and other devices not shown.

In the depicted example, network data processing system 500 is the Internet with network 502 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 500 also may be implemented as a number of different types of networks, such as for example, an intranet, a local area network (LAN), or a wide area network (WAN). FIG. 4 is intended as an example, and not as an architectural limitation for the different illustrative embodiments.

With reference now to FIG. 5, a block diagram of a data processing system is shown in which illustrative embodiments may be implemented. Data processing system 600 is an example of a computer, such as server 504 or client 510 in FIG. 4, in which computer usable program code or instructions implementing the processes may be located for the illustrative embodiments. In this illustrative example, data processing system 600 includes communications fabric 602, which provides communications between processor unit 604, memory 606, persistent storage 608, communications unit 610, input/output (I/O) unit 612, and display 614.

Processor unit 604 serves to execute instructions for software that may be loaded into memory 606. Processor unit 604 may be a set of one or more processors or may be a multi-processor core, depending on the particular implementation. Further, processor unit 604 may be implemented using one or more heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices. A storage device is any piece of hardware that is capable of storing information either on a temporary basis and/or a permanent basis. Memory 606, in these examples, may be, for example, a random access memory or any other suitable volatile or non-volatile storage device. Persistent storage 608 may take various forms depending on the particular implementation. For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communications links.

Input/output unit 612 allows for input and output of data with other devices that may be connected to data processing system 600. For example, input/output unit 612 may provide a connection for user input through a keyboard and mouse.

Further, input/output unit 612 may send output to a printer. Display 614 provides a mechanism to display information to a user.

Instructions for the operating system and applications or programs are located on persistent storage 608. These instructions may be loaded into memory 606 for execution by processor unit 604. The processes of the different embodiments may be performed by processor unit 604 using computer implemented instructions, which may be located in a memory, such as memory 606. These instructions are referred to as program code, computer usable program code, or computer readable program code that may be read and executed by a processor in processor unit 604. The program code in the different embodiments may be embodied on different physical or tangible computer readable media, such as memory 606 or persistent storage 608.

Program code 616 is located in a functional form on computer readable media 618 that is selectively removable and may be loaded onto or transferred to data processing system 600 for execution by processor unit 604. Program code 616 and computer readable media 618 form computer program product 620 in these examples. In one example, computer readable media 618 may be in a tangible form, such as, for example, an optical or magnetic disc that is inserted or placed into a drive or other device that is part of persistent storage 608 for transfer onto a storage device, such as a hard drive that is part of persistent storage 608. In a tangible form, computer readable media 618 also may take the form of a persistent storage, such as a hard drive, a thumb drive, or a flash memory that is connected to data processing system 600. The tangible form of computer readable media 618 is also referred to as computer recordable storage media. In some instances, computer recordable media 618 may not be removable.

Alternatively, program code 616 may be transferred to data processing system 600 from computer readable media 618 through a communications link to communications unit 610 and/or through a connection to input/output unit 612. The communications link and/or the connection may be physical or wireless in the illustrative examples. The computer readable media also may take the form of non-tangible media, such as communications links or wireless transmissions containing the program code.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 5 can be varied from the illustrative examples shown. As one example, a storage device in data processing system 600 is any hardware apparatus that may store data. Memory 606, persistent storage 608, and computer readable media 618 are examples of storage devices in a tangible form.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 606 or a cache such as found in an interface and memory controller hub that may be present in communications fabric 602.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Figure 3:
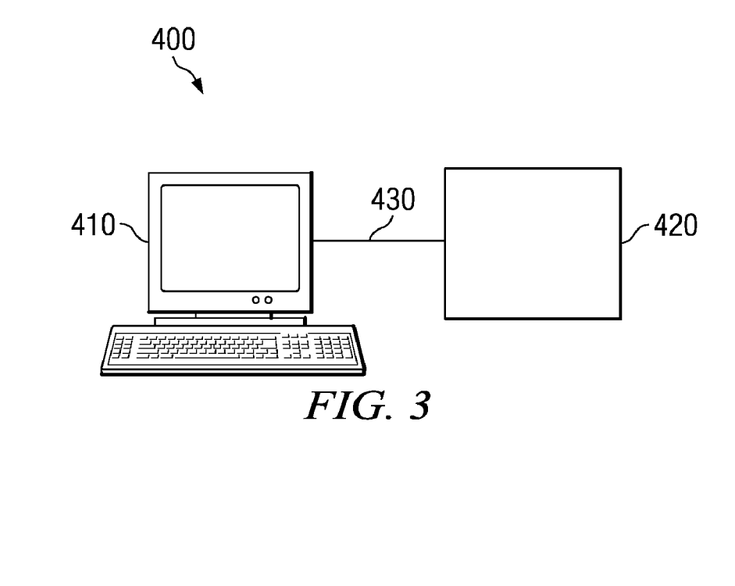
FIG. 3 is a high-level overview of the overall system environment 400.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. that is executing by data processing system 410 of FIG. 3 that is operatively coupled at 430 to a software emulator 420. The software emulator can alternatively be an integral part of data processing system 410.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for testing impacts of soft errors on a software application program, comprising steps of:
    randomly injecting an error in at least one of (i) source operand of an instruction, (ii) destination operand of the instruction, (iii) opcode of the instruction and (iv) program counter, wherein the randomly injected error occurs in conjunction with executing the instruction;
    determining whether the injected error caused the software application program to produce a consequential erroneous result;
    modifying a derating factor of the software application program based on the consequential error determination; and
    wherein the program counter is injected with the error if the instruction is determined to be a branch instruction.

2. The method of claim 1, wherein the software application program is executed by a software emulator.

3. The method of claim 1, wherein the error is injected in the source operand of the instruction, and the error is injected before the instruction is executed.

4. The method of claim 3, wherein an initial value for the source operand is logged before the source operand is injected with the error, and wherein the source operand is restored to the initial value after the instruction is executed.

5. The method of claim 1, wherein the error is injected in the destination operand of the instruction, and the error is injected after the instruction is executed.

6. The method of claim 1, wherein the program counter is injected with the error after the branch instruction is executed.

7. A method for testing impacts of soft errors on a software application program, comprising steps of:
    loading the software application program into an emulator;
    executing X instructions by the emulator;
    determining if instruction X+1 is a branch instruction;
    responsive to the X+1 instruction being the branch instruction, executing the X+1 instruction and then modifying the program counter to be a different, erroneous value to form a modified execution flow;
    responsive to the X+1 instruction not being the branch instruction, modifying an operand of the X+1 instruction and executing the X+1 instruction to form a modified operand flow;
    executing additional instructions of the software application program;
    determining if at least one of the modified execution flow and the modified operand flow caused a consequential error in execution of the software application program; and
    modifying and storing into memory a derating factor of the software application program based on the consequential error determination.

8. The method of claim 7, wherein if the X+1 instruction is not the branch instruction, the source operand of the X+1 instruction is modified before the X+1 instruction is executed.

9. The method of claim 8, wherein an initial value for the source operand is logged before the source operand is modified, and wherein the source operand is restored to the initial value after the X+1 instruction is executed.

10. The method of claim 7, wherein if the X+1 instruction is not the branch instruction, the destination operand of the X+1 instruction is modified after the X+1 instruction is executed.

11. A data processing system comprising:
    a bus;
    a memory connected to the bus, wherein a set of instructions are located in the memory;
    a processing unit connected to the bus, wherein the processing unit executes the set of instructions to randomly injecting an error in at least one of (i) source operand of an instruction, (ii) destination operand of the instruction, (iii) opcode of the instruction and (iv) program counter, wherein the randomly injected error occurs in conjunction with executing the instruction; executes the instruction; determines whether the injected error caused the software application program to produce a consequential erroneous result; and modifies a derating factor of the software application program based on the consequential error determination; and
    wherein the program counter is injected with the error if the instruction is determined to be a branch instruction.

12. The data processing system of claim 11, wherein the software application program is executed by a software emulator.

13. The data processing system of claim 11, wherein the error is injected in the source operand of the instruction, and the error is injected before the instruction is executed.

14. The data processing system of claim 13, wherein an initial value for the source operand is logged before the source operand is injected with the error, and wherein the source operand is restored to the initial value after the instruction is executed.

15. The data processing system of claim 11, wherein the error is injected in the destination operand of the instruction, and the error is injected after the instruction is executed.

16. The data processing system of claim 11, wherein the program counter is injected with the error after the branch instruction is executed.

* * * * *